(12) United States Patent
Chae et al.

(10) Patent No.: US 9,819,243 B2
(45) Date of Patent: Nov. 14, 2017

(54) ROTOR FOR WOUND ROTOR SYNCHRONOUS MOTOR

(71) Applicant: HYUNDAI MOTOR COMPANY, Seoul (KR)

(72) Inventors: WoongChan Chae, Gwangmyeong-si (KR); Sanghoon Moon, Yongin-si (KR); Sangjin Park, Hwaseong-si (KR); Hyoungjun Cho, Suwon-si (KR); Jung Shik Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/178,242

(22) Filed: Jun. 9, 2016

(65) Prior Publication Data

US 2017/0163120 A1 Jun. 8, 2017

(30) Foreign Application Priority Data

Dec. 2, 2015 (KR) .................. 10-2015-0171013

(51) Int. Cl.
| | | |
|---|---|---|
| *H01R 39/08* | (2006.01) | |
| *H02K 3/52* | (2006.01) | |
| *H02K 1/22* | (2006.01) | |
| *H02K 7/08* | (2006.01) | |
| *H02K 13/00* | (2006.01) | |
| *H02K 27/02* | (2006.01) | |

(52) U.S. Cl.
CPC .............. *H02K 3/527* (2013.01); *H02K 1/22* (2013.01); *H02K 7/083* (2013.01); *H02K 13/003* (2013.01); *H02K 27/02* (2013.01)

(58) Field of Classification Search
CPC .......... H02K 3/527; H02K 1/22; H02K 7/083; H02K 13/003; H02K 27/02; H02K 13/04; H02K 23/38
USPC .................................................. 310/219–252
See application file for complete search history.

(56) References Cited

U.S. PATENT DOCUMENTS

| | | | |
|---|---|---|---|
| 4,833,357 A * | 5/1989 | Tamura .................. | H02K 13/06 310/221 |
| 5,612,584 A | 3/1997 | York et al. | |
| 6,611,077 B2 | 8/2003 | Yokomizo et al. | |
| 2001/0030485 A1* | 10/2001 | Kiyose .................. | H02K 13/04 310/233 |
| 2002/0180301 A1* | 12/2002 | Ebihara .................. | H01R 39/06 310/239 |

(Continued)

FOREIGN PATENT DOCUMENTS

| | | |
|---|---|---|
| JP | 2005-318688 A | 11/2005 |
| JP | 2008-236934 A | 10/2008 |

(Continued)

*Primary Examiner* — Thanh Lam
(74) *Attorney, Agent, or Firm* — McDermott Will & Emery LLP

(57) ABSTRACT

A rotor of a wound rotor synchronous motor includes: a rotor body coupled to a rotation shaft and around which a rotor coil is wound; and a slip ring module mounted on one portion of the rotation shaft, the slip ring module comprising a brush contact portion configured to contact a brush, a terminal mounting portion connected to the brush contact portion, and a fusing terminal mounted at an exterior circumferential surface of the terminal mounting portion and connected to the rotor coil.

17 Claims, 6 Drawing Sheets

(56) References Cited

U.S. PATENT DOCUMENTS

| | | | | |
|---|---|---|---|---|
| 2004/0066110 A1* | 4/2004 | Kageyama | ............ | H01R 39/04 310/233 |
| 2007/0152531 A1* | 7/2007 | Santo | ................... | H02K 13/105 310/233 |
| 2015/0194779 A1* | 7/2015 | Jo | .......................... | H01R 39/32 310/234 |

FOREIGN PATENT DOCUMENTS

| | | |
|---|---|---|
| JP | 2009-033836 A | 2/2009 |
| JP | 2015-016805 A | 1/2015 |
| JP | 2015-116015 A | 6/2015 |

\* cited by examiner

ROTOR FOR WOUND ROTOR SYNCHRONOUS MOTOR

CROSS-REFERENCE TO RELATED APPLICATION

This application claims the benefit of priority to Korean Patent Application No. 10-2015-0171013, filed in the Korean Intellectual Property Office on Dec. 2, 2015, the entirety of which is incorporated herein by reference.

TECHNICAL FIELD

The present disclosure relates to a rotor for a wound rotor synchronous motor.

BACKGROUND

In general, a hybrid vehicle or an electric vehicle is operated by an electric motor (hereinafter referred to as a "drive motor") generating torque using electrical energy.

A hybrid vehicle may operate in an electric vehicle (EV) mode in which only the torque of the drive motor is used, and may operate in a hybrid electric vehicle (HEV) mode in which both the torque of the engine and the torque of the drive motor are used. The electric vehicle operates using the torque of the drive motor.

Most drive motors used as power sources for vehicles are permanent magnet synchronous motors (PMSM). The performance of a permanent magnet is maximized to obtain the greatest output from the PMSM in a limited layout condition.

In a permanent magnet, a neodymium (Nd) constituent improves the strength of the permanent magnet, and a dysprosium (Dy) constituent improves high temperature demagnetization endurance. However, such rare earth metal (Nd and Dy) constituents of the permanent magnet are deposited in limited countries, such as China, are very expensive, and have significant price fluctuations.

In view of this, induction motors have been studied, but the application of induction motors has limitations in that an excessive increase of volume and weight may be required to output the same motor performance.

In recent years, development of a wound rotor synchronous motor (WRSM) as a drive motor to be used for a power source of the vehicle has been undertaken to replace the PMSM.

The WRSM has a coil that is wound, not only on a stator, but also on a rotor for electro-magnetizing the rotor when a current is applied to the rotor to replace the PMSM.

In the WRSM, the rotor is spaced apart from the stator by a predetermined gap, and a magnetic flux is generated by applying a current to a rotor coil through a brush and a slip ring.

The rotor coil is wound around the rotor core. The rotor core is combined with a rotation shaft. The slip ring is mounted to one portion of the rotation shaft. The brush contacts the slip ring integrally rotating with the rotation shaft, and applies a DC current to the rotor coil.

The slip ring is electrically connected to the rotor coil through a fusing terminal. The fusing terminal is compressed by a fusing machine in a state of supporting a positive connection terminal and negative connection terminal of the rotor coil, and is welded to the rotor coil by resistance welding.

A sufficient insulation distance must be secured between the fused portion connecting the fusing terminal to the connection terminal of the rotor coil and a coil winding portion wound by the rotor coil.

In addition, a sufficient working space in which parts of the rotor do not interfere with the fusing machine must be secured in order to fuse the fusing terminal and the connection terminal of the rotor core using the fusing machine.

In order to secure the sufficient insulation distance and the sufficient working space, an entire length of the drive motor is unavoidably increased.

The above information disclosed in this Background section is only for enhancement of understanding of the background of the disclosure and therefore may contain information that does not form the prior art that is already known in this country to a person of ordinary skill in the art.

SUMMARY

The present disclosure has been made in an effort to provide a rotor of a wound rotor synchronous motor that secures a sufficient insulation distance between a fusing terminal and a coil winding portion wound by a rotor coil and that secures a sufficient working space in which parts of the rotor do not interfere with a fusing machine without increasing an entire length of the motor.

A rotor of a wound rotor synchronous motor according to an exemplary embodiment in the present disclosure includes: a rotor body coupled to a rotation shaft and around which a rotor coil is wound; and a slip ring module mounted on one portion of the rotation shaft, the slip ring module comprising a brush contact portion configured to contact a brush, a terminal mounting portion connected to the brush contact portion, and a fusing terminal mounted at an exterior circumferential surface of the terminal mounting portion and connected to the rotor coil, wherein the fusing terminal is connected to the rotor coil within a range of a width of the terminal mounting portion and receives fusing pressure in a direction perpendicular to a surface including an axial direction of the rotation shaft.

The fusing terminal may include a fixing portion having a width that corresponds to the width of the terminal mounting portion, and fixed at the terminal mounting portion, and a connection portion integrally connected to the fixing portion, and connected to the rotor coil.

The fixing portion may be fixed at the exterior circumferential surface of the terminal mounting portion in a circumferential direction of the terminal mounting portion, and the connection portion may be twisted from the fixing portion and may be bent in the circumferential direction of the terminal mounting portion.

A width direction of the fixing portion may cross a width direction of the connection portion.

The connection portion may be twisted by 90 degrees with respect to the fixing portion.

A width direction of the connection portion may parallel to a width direction of the terminal mounting portion.

The connection portion may be disposed within the range of the width of the terminal mounting portion, and a width of the connection portion may equal to the width of the terminal mounting portion.

The connection portion may receive the fusing pressure in a direction perpendicular to a width direction of the connection portion.

The connection portion may receive the fusing pressure in a width direction of the fixing portion.

The fusing terminal may further include a twist portion twisted from the fixing portion.

The fixing portion may be integrally connected to the connection portion through the twist portion.

According to another exemplary embodiment in the present disclosure, a rotor of a wound rotor synchronous motor includes: a rotor body in which a rotation shaft is coupled and around which a rotor coil is wound; and a slip ring module mounted on one portion of the rotation shaft, the slip ring module comprising a brush contact portion configured to contact a brush, a terminal mounting portion connected to the brush contact portion, and a fusing terminal mounted at an exterior circumferential surface of the terminal mounting portion and connected to the rotor coil, wherein the fusing terminal comprises a fixing portion fixed at the terminal mounting portion, and a connection portion twisted from the fixing portion outwardly in a radial direction of the rotation shaft, disposed within a range of a width of the terminal mounting portion, and receiving fusing pressure in a direction perpendicular to a surface including an axial direction of the rotation shaft to be connected to the rotor coil.

The fusing terminal may further include a twist portion integrally connecting the fixing portion to the connection portion.

The connection portion may be bent in a circumferential direction of the terminal mounting portion.

The fixing portion may have a width that corresponds to the width of the terminal mounting portion and a width direction of the fixing portion may correspond to a circumferential direction of the mounting portion.

The width direction of the fixing portion may cross a width direction of the connection portion and the width direction of the connection portion may be parallel to a width direction of the terminal mounting portion.

The connection portion may receive the fusing pressure in a direction perpendicular to the width direction of the connection portion.

Since a fused portion connecting a connection terminal of the fusing terminal to the rotor coil is formed within the range of the width of the terminal mounting portion, a sufficient insulation distance between the fused portion and a coil winding portion wound by the rotor coil may be secured without increasing an entire length of the motor.

In addition, the connection portion may be connected to the rotor coil by applying fusing pressure of a fusing machine to the connection portion in a direction perpendicular to an axial direction of the rotation shaft in which parts of the rotor are mounted.

Accordingly, since an additional working space for avoiding interference between the fusing machine and the parts of the rotor is not required, the entire length of the motor may be reduced.

BRIEF DESCRIPTION OF THE DRAWINGS

The attached drawings illustrate exemplary embodiments in the present disclosure, and are provided for describing the exemplary embodiments in more detail, but are not for limiting technical aspects of the present invention.

DETAILED DESCRIPTION OF THE EMBODIMENTS

The present disclosure will be described more fully hereinafter with reference to the accompanying drawings, in which exemplary embodiments are shown. As those skilled in the art would realize, the described embodiments may be modified in various different ways, all without departing from the spirit or scope of the present invention.

Parts not relevant to the present invention will be omitted for describing the present invention clearly, and throughout the specification, identical or similar parts will be given the same reference numbers.

Since size and thickness of elements are shown in drawings are arbitrarily shown for convenience of description, but the scope of the present invention is not necessarily limited to the drawings, and the thickness is magnified to clearly express several parts and regions.

Further, although terms including ordinal numbers, such as first or second, can be used for describing various elements, the elements are not confined by the terms, and are only used for making one element distinctive from other elements.

Throughout the specification, unless explicitly described to the contrary, the word "comprise" and variations such as "comprises" or "comprising" will be understood to imply the inclusion of stated elements but not the exclusion of any other elements.

In addition, the terms " . . . unit", " . . . means", " . . . er", " . . . member" described in the specification mean units for processing at least one function or operation.

Figure 1:
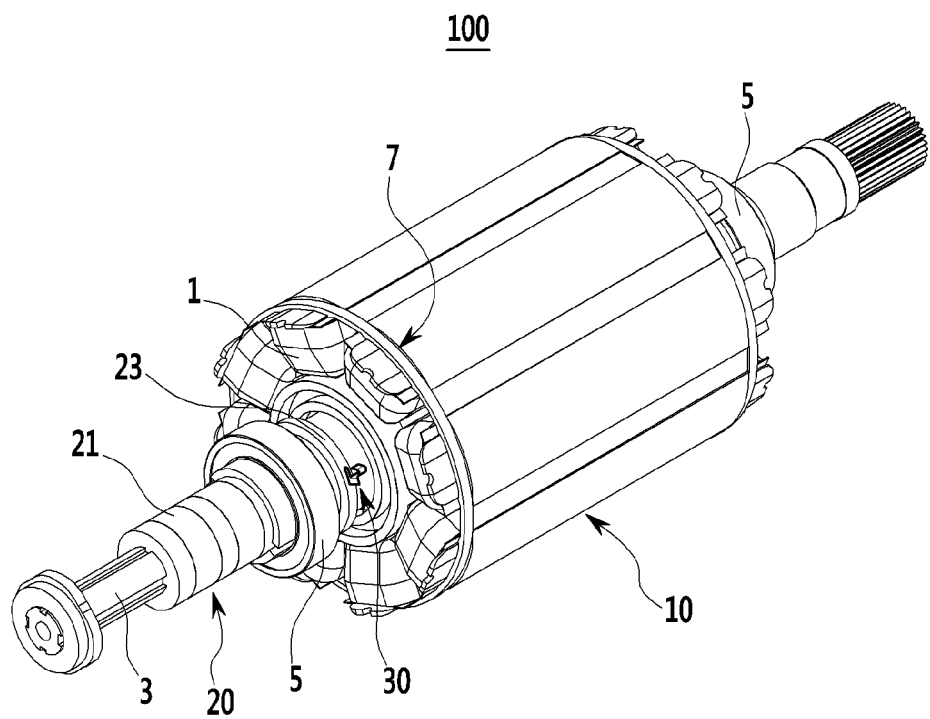
FIG. 1 is a perspective view illustrating a rotor of a wound rotor synchronous motor according to an exemplary embodiment in the present disclosure.
Figure 2:
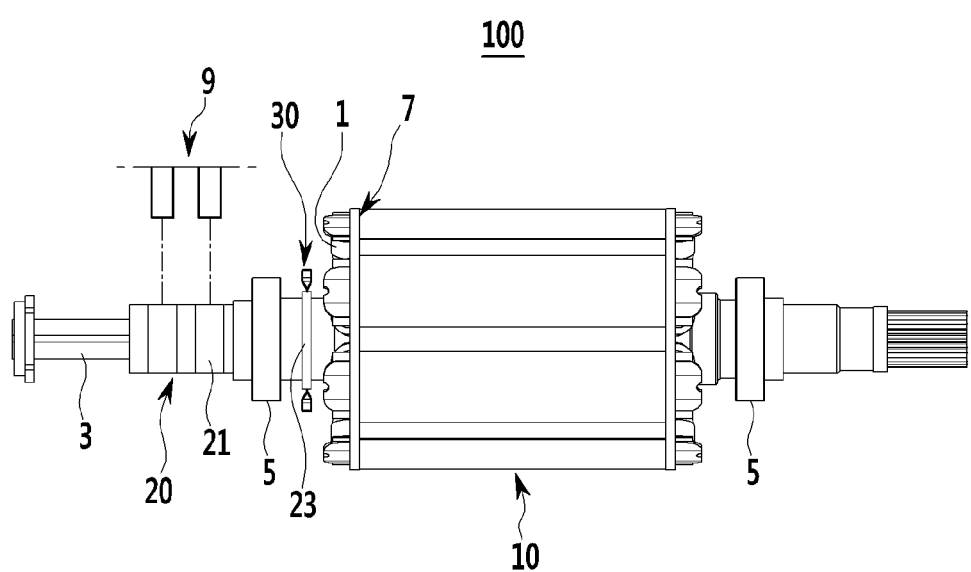
FIG. 2 is a front view a rotor of a wound rotor synchronous motor according to the exemplary embodiment.

FIG. 1 is a perspective view illustrating a rotor for a wound rotor synchronous motor according to an exemplary embodiment in the present disclosure, and FIG. 2 is a front view a rotor of a wound rotor synchronous motor according to the exemplary embodiment.

Referring to FIGS. 1 and 2, a rotor 100 according to an exemplary embodiment may be applied to a wound rotor synchronous motor (WRSM) generating torque using electrical energy.

The WRSM includes a stator (not shown) wound by a stator coil (not shown) and the rotor 100 wound by a rotor coil 1 and disposed inside the stator.

The rotor 100 is spaced apart from an interior circumferential surface of the stator by a predetermined gap.

The WRSM has coil wound, not only around the stator, but also around the rotor 100 for electro-magnetizing the rotor 100 when a current is applied thereto to generate torque by the attractive and repulsive forces between the electromagnet of the rotor 100 and the electromagnet of the stator.

The rotor 100 according to an exemplary embodiment in the present disclosure includes a rotor body 10 and a slip ring module 20.

The rotor body 10 is rotatably installed inside of the stator with a predetermined gap. A rotation shaft 3 is coupled in a center portion of the rotor body 10. Both ends of the rotation shaft 3 protrude to both sides of the rotation body 10. Bearings 5 are installed at the protruded portions of the rotation shaft 3.

The rotor body 10 includes a rotor core (not shown) disposed in an axial direction of the rotation shaft 3. The rotor coil 1 is wound around the rotor core.

Bobbins 7 supporting the rotor coil 1 are installed at both ends of the rotor body 10, and end caps (not shown) may cover the both ends of the rotor body 10. Because the bobbins 7 and the end caps are to configure the rotor body 10, except for an exceptional case, the bobbins 7 and the end caps are generally referred to as the rotor body 10 in the exemplary embodiment.

The slip ring module 20 is fixedly mounted to one portion of the rotation shaft 3, and is electrically connected to a connection terminal of the rotor coil 1. The connection terminal of the rotor coil 10 includes a positive (+) connection terminal and a negative (−) connection terminal. The slip ring module 20 provides a DC current applied from a brush 9 to the rotor coil 1.

The brush 9 contacts the slip ring module 20 integrally rotating the rotation shaft 3, applies the DC current to the rotor coil 1 through the slip ring module 20, and may be adhered to the slip ring module 20 by the elastic force of a spring.

The slip ring module 20 includes a brush contact portion 21, a terminal mounting portion 23, and a fusing terminal 30. The brush contact portion 21 with which the brush 9 comes into contact is formed in a cylindrical shape, and is fixed at one portion of the rotation shaft 3.

The terminal mounting portion 23 has an annular shape, is integrally connected to the brush contact portion 21, and is fixed at the rotation shaft 3.

The fusing terminal 30 is used to electrically connect the terminal mounting portion 23 to the rotor coil 1. The fusing terminal 30 is fixedly mounted at an exterior circumferential surface of the terminal mounting portion 23.

The fusing terminal 30 is compressed by a fusing machine in a state of supporting the connection terminal of the rotor coil 1, and may be welded to the rotor coil 1 by resistance welding.

In particular, the fusing terminal 30 forms a fused portion electrically connected to the connection terminal of the rotor coil 1. A structure of the fusing terminal 30 according to the exemplary embodiment will be described in more detail below.

The fusing terminal 30 according to the exemplary embodiment has a structure capable of reducing an entire length of the drive motor.

According to the exemplary embodiment, a sufficient insulation distance between the fused portion and a coil winding portion wound by the rotor coil 1 may be secured without increasing the entire length of the drive motor, and a sufficient working space in which the fusing machine is not interfered by the rotor body 10 may be secured.

Figure 3:
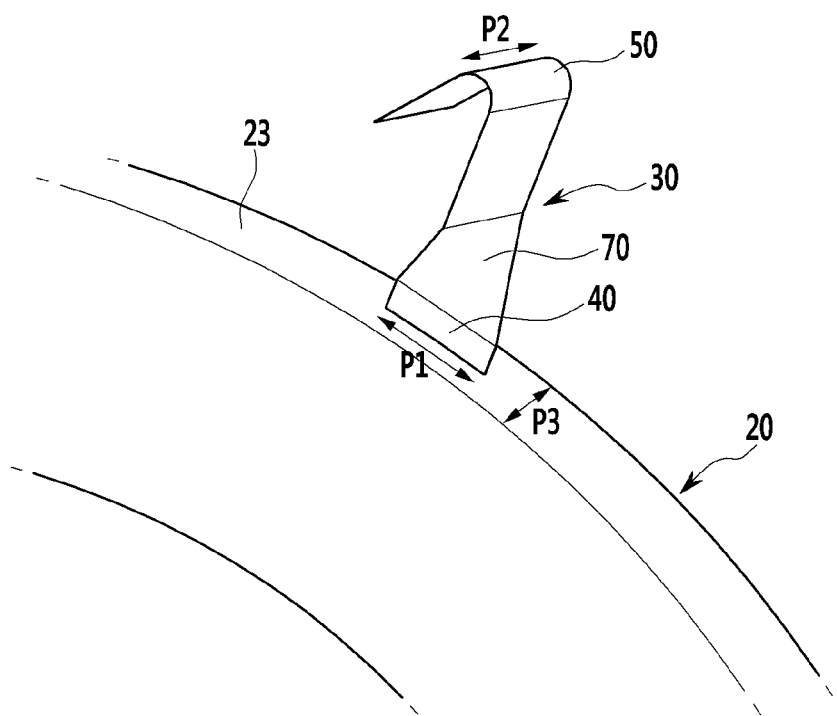
FIG. 3 and FIG. 4 are views illustrating a fusing terminal applied to a rotor of a wound rotor synchronous motor according to an exemplary embodiment.
Figure 4:
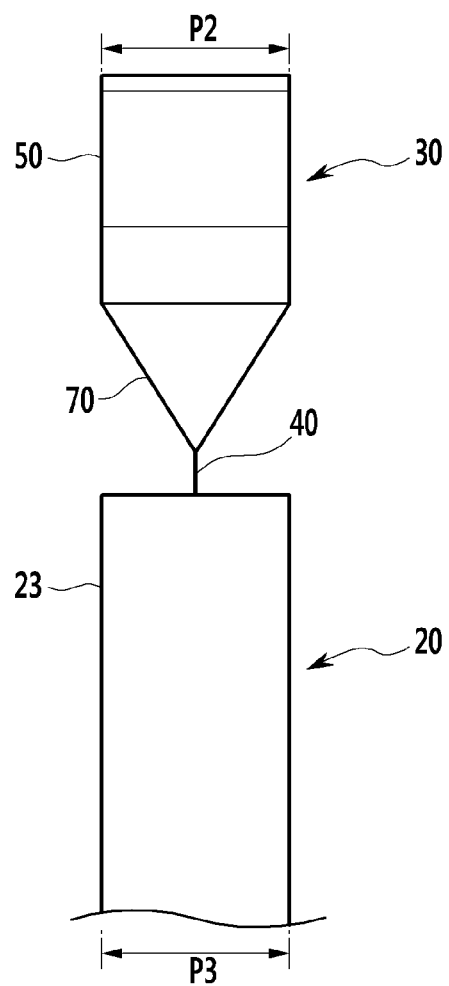

FIGS. 3 and 4 are views illustrating a fusing terminal applied to a rotor of a wound rotor synchronous motor according to the exemplary embodiment.

Referring to FIGS. 1 to 4, the fusing terminal 30 according to the exemplary embodiment may include a fixing portion 40 and a connection portion 50. The fusing terminal 30 may be formed in a band shape having a predetermined width, and may be formed from a conductive material.

The fusing terminal 30 is connected to the rotor coil 1 within a range of a width of the terminal mounting portion 23 by fusing, and may receive fusing pressure from the fusing machine in a direction perpendicular to a surface including an axial direction of the rotation shaft 3.

In other words, in a state of supporting the connection terminal of the rotor coil 1, the fusing terminal 30 is compressed by the fusing pressure in the direction perpendicular to the surface including the axial direction of the rotation shaft 3, is welded to the connection terminal of the rotor coil 1 by resistance welding, and is electrically connected to the connection terminal of the rotor coil 1.

For this purpose, the fixing portion 40 has a width that corresponds to the width of the terminal mounting portion 23, and is fixed at the terminal mounting portion 23. A width direction (P1) of the fixing portion 40 corresponds to a circumferential direction of the terminal mounting portion 23.

The connection portion 50 connected to the rotor coil 1 by fusing is integrally formed with the fixing portion 40, is twisted from the fixing portion 40, and is bent in the circumferential direction of the terminal mounting portion 23.

The connection portion 50 may be twisted by 90 degrees with respect to the fixing portion 40, and is disposed within the range of the width of the terminal mounting portion 23.

The connection portion 50 is bent in the circumferential direction of the terminal mounting portion 23, and receives the fusing pressure from the fusing machine in the direction perpendicular to the surface including the axial direction of the rotation shaft 3 in a state in which the connection terminal of the rotor coil 1 is connected to the bent portion.

The bent portion of the connection portion 50 is compressed by the fusing pressure in the direction perpendicular to the surface including the axial direction of the rotation shaft 3 within the range of the width of the terminal mounting portion 23, is welded to the connection terminal of the rotor coil 1 by the resistance welding, and is electrically connected to the connection terminal of the rotor coil 1.

The connection portion 50 is twisted from the fixing portion 40 outwardly in a radial direction of the rotation shaft 3, and is bent in the circumferential direction of the terminal mounting portion 23. The bent portion of the connection portion 50 is connected to the connection terminal of the rotor coil 1 by fusing.

Since the connection portion 50 is twisted from the fixing portion 40, a twist portion 70 is formed between the fixing portion 40 and the connection portion 50. The twist portion 70 is a portion twisted by 90 degrees with respect to the fixing portion 40, and integrally connects the fixing portion 40 and the connection portion 50.

The connection portion 50 is disposed within the range of the width of the terminal mounting portion 23, and a width of the connection portion 50 may be equal to the width of the terminal mounting portion 23. The width direction (P1) of the fixing portion 40 intersects a width direction (P2) of the connection portion 50. Accordingly, the width direction (P2) of the connection portion 50 is parallel to a width direction (P3) of the terminal mounting portion 23.

The connection portion 50 is connected to the rotor coil 1 by receiving the fusing pressure from the fusing machine in a direction perpendicular to the width direction (P2). In other words, the connection portion 50 is connected to the rotor coil 1 by receiving the fusing pressure in the width direction (P1) of the fixing portion.

A process of connecting the fusing terminal 30 to the connection terminal of the rotor coil 1 will be described below. First, the connection portion 50 of the fusing terminal 30 fixed at the terminal mounting portion 23 of the slip ring module 20 contacts with the connection terminal or the rotor coil 1.

The connection portion 50 is twisted from the fixing portion 40, and is bent in the circumferential direction of the terminal mounting portion 23. The bent portion may contact with the connection terminal of the rotor coil 1.

In this state, the fusing machine may apply the fusing pressure to the connection portion 50 in the direction perpendicular to the surface including the axial direction of the rotation shaft 3 within the range of the width of the terminal mounting portion 23.

The connection portion 50 may be compressed by the fusing pressure in the direction perpendicular to the surface including the axial direction of the rotation shaft 3, and may be connected to the connection terminal of the rotor coil 1 by the resistance welding.

According to the exemplary embodiment, the fusing terminal 30 in which the connection portion 50 is twisted from the fixing portion 40 may be configured within the range of the width of the terminal mounting portion 23.

Since the fused portion connecting the connection portion of the fusing terminal 30 to the rotor coil 1 is formed within the range of the width of the terminal mounting portion 23, a sufficient insulation distance between the fused portion and a coil winding portion wound by the rotor coil 1 may be secured.

In addition, since the connection portion 50 is twisted from the fixing portion 40, the twisted portion 70 is formed between the fixing portion 40 and the connection portion 50, and the fusing pressure of the fusing machine may be applied to the connection portion 50 in the direction perpendicular to the width direction (P2) of the connection portion 50.

Accordingly, since an additional working space for avoiding interference between the fusing machine and parts of the rotor is not required, the entire length of the drive motor may be reduced.

Hereinafter, an operational effect of the fusing terminal 30 according to an exemplary embodiment in the present disclosure will be described in comparison to a comparative example.

Figure 5A:
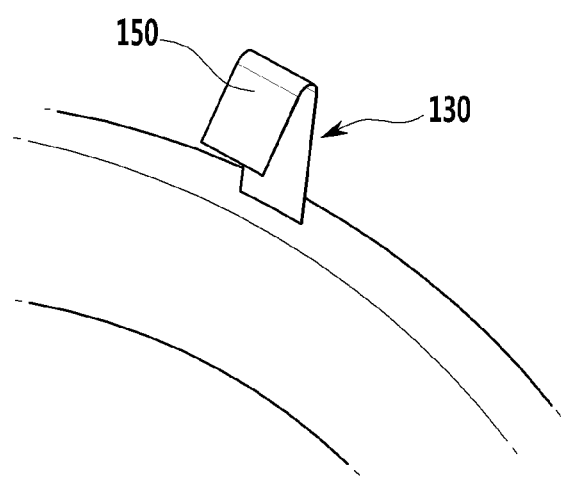
FIG. 5A and FIG. 5B are views illustrating a fusing terminal according to a comparative example for describing an operational effect of a fusing terminal according to an exemplary embodiment.
Figure 5B:
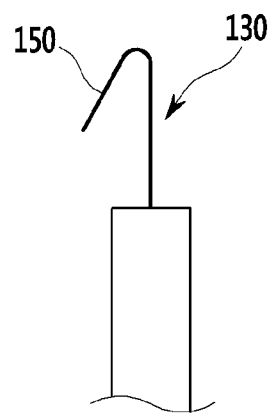

FIG. 5A and FIG. 5B are views illustrating a fusing terminal according to a comparative example for describing an operational effect of a fusing terminal according to the exemplary embodiment.

In the comparative example shown in FIG. 5A and FIG. 5B, a fusing terminal 130 is configured to have a connection portion 150 bent in an axial direction of a rotation shaft. Since the connection portion 150 is bent in the axial direction of the rotation shaft, the fusing machine must apply fusing pressure to the connection portion 150 in the axial direction of the rotation shaft.

In this case, interference between the fusing machine and parts of the rotor occurs, and thus an additional working space for fusing is required such that an entire length of the drive motor is unavoidably increased.

However, in an exemplary embodiment in the present disclosure, since the fusing pressure is applied to the connection portion 50 in a direction perpendicular to the axial direction of the rotation shaft 3, the additional working space for avoiding the interference between the fusing machine and parts of the rotor is not required such that the entire length of the drive motor may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rotor of a wound rotor synchronous motor, comprising:
    a rotor body coupled to a rotation shaft and around which a rotor coil is wound; and
    a slip ring module mounted on one portion of the rotation shaft, the slip ring module comprising a brush contact portion configured to contact a brush,
    a terminal mounting portion connected to the brush contact portion, and
    a fusing terminal mounted at an exterior circumferential surface of the terminal mounting portion and connected to the rotor coil,
    wherein the fusing terminal is connected to the rotor coil within a range of a width of the terminal mounting portion and receives fusing pressure in a direction perpendicular to a surface including an axial direction of the rotation shaft.

2. The rotor of claim 1, wherein the fusing terminal comprises:
    a fixing portion having a width corresponding to the width of the terminal mounting portion, and fixed at the terminal mounting portion; and
    a connection portion integrally connected to the fixing portion, and connected to the rotor coil.

3. The rotor of claim 2, wherein the fixing portion is fixed at the exterior circumferential surface of the terminal mounting portion in a circumferential direction of the terminal mounting portion, and
    the connection portion is twisted from the fixing portion and is bent in the circumferential direction of the terminal mounting portion.

4. The rotor of claim 2, wherein a width direction of the fixing portion intersects a width direction of the connection portion.

5. The rotor of claim 3, wherein the connection portion is oriented at a 90 degree angle with respect to the fixing portion.

6. The rotor of claim 3, wherein a width direction of the connection portion is parallel to a width direction of the terminal mounting portion.

7. The rotor of claim 3, wherein the connection portion is disposed within the range of the width of the terminal mounting portion, and a width of the connection portion is equal to the width of the terminal mounting portion.

8. The rotor of claim 3, wherein the connection portion receives the fusing pressure in a direction perpendicular to a width direction of the connection portion.

9. The rotor of claim 3, wherein the connection portion receives the fusing pressure in a width direction of the fixing portion.

10. The rotor of claim 3, wherein the fusing terminal further comprises a twist portion twisted from the fixing portion.

11. The rotor of claim 10, wherein the fixing portion is integrally connected to the connection portion through the twist portion.

12. A rotor of a wound rotor synchronous motor, comprising:
    a rotor body coupled to a rotation shaft and around which a rotor coil is wound; and
    a slip ring module mounted on one portion of the rotation shaft, the slip ring module comprising a brush contact portion configured to contact a brush,
    a terminal mounting portion connected to the brush contact portion, and
    a fusing terminal mounted at an exterior circumferential surface of the terminal mounting portion and connected to the rotor coil, and
    wherein the fusing terminal comprises a fixing portion fixed at the terminal mounting portion, and a connection portion twisted from the fixing portion outwardly in a radial direction of the rotation shaft, disposed within a range of a width of the terminal mounting portion, and receiving fusing pressure in a direction perpendicular to a surface including an axial direction of the rotation shaft to be connected to the rotor coil.

13. The rotor of claim 12, wherein the fusing terminal further comprises a twist portion integrally connecting the fixing portion to the connection portion.

14. The rotor of claim 12, wherein the connection portion is bent in a circumferential direction of the terminal mounting portion.

15. The rotor of claim 12, wherein the fixing portion has a width corresponding to the width of the terminal mounting portion and a width direction of the fixing portion corresponds to a circumferential direction of the mounting portion.

16. The rotor of claim 15, wherein the width direction of the fixing portion intersects a width direction of the connection portion and the width direction of the connection portion is parallel to a width direction of the terminal mounting portion.

17. The rotor of claim 16, wherein the connection portion receives the fusing pressure in a direction perpendicular to the width direction of the connection portion.

* * * * *